Aug. 23, 1932.  W. S. WATTS  1,873,086

SUPPORT

Filed Feb. 23, 1929

INVENTOR
William S. Watts
BY
Jn. W. McConkey
ATTORNEY

Patented Aug. 23, 1932

1,873,086

UNITED STATES PATENT OFFICE

WILLIAM S. WATTS, OF SOUTH BEND, INDIANA, ASSIGNOR TO BENDIX BRAKE COMPANY, OF SOUTH BEND, INDIANA, A CORPORATION OF ILLINOIS

SUPPORT

Application filed February 23, 1929. Serial No. 342,102.

This invention relates to ball-and-socket supports or joints, especially of a type arranged rotatably to support a shaft, and is illustrated as embodied in a novel support for the chassis end of an operating shaft for a brake on a front automobile wheel. An object of the invention is to provide a strong and inexpensive support which can be built up of steel or brass stampings, and the parts of which are held under spring tension to take up automatically for wear.

Figure 1:
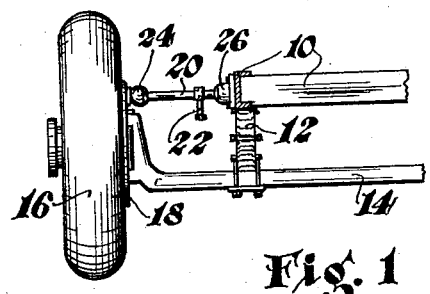
Figure 2:
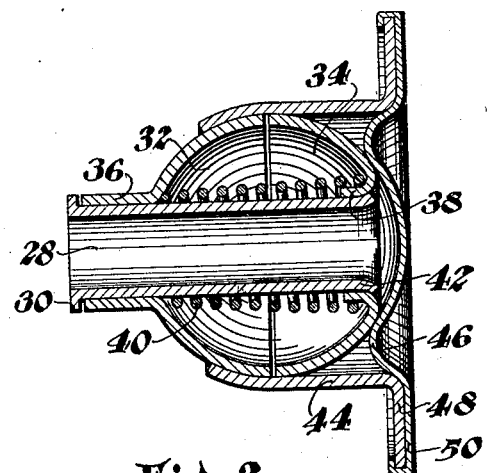

The above and other objects and features of the invention, including various novel and desirable details of construction, will be apparent from the following description of the illustrative embodiment shown in the accompanying drawing, in which:

Figure 1 is a vertical section through part of an automobile chassis, showing the control mechanism of one front brake in rear elevation; and Figure 2 is a section through the support at the chassis end of the brake control shaft.

In the arrangement of Figure 1, the chassis frame 10 is supported by a spring 12 on an axle 14, at the end of which is swiveled a road wheel 16 having a brake 18. The brake 18 is operated by a shaft 20 having an operating lever 22 and connected to the brake cam by a suitable universal joint 24 arranged substantially at the swiveling axis of the wheel.

The present invention relates to a novel support 26 for the chassis end of shaft 20, which support is shown in detail in Figure 2. It includes a sleeve 28, which may be a length of tubing or formed in any other desired manner, and which has its left end formed with a flange 30, and which slidably and rotatably receives and supports the end of shaft 20.

The ball member of the joint includes this sleeve 28, and two hemispherical stampings 32 and 34 having alined central tubular portions 36 and 38 slidably mounted on sleeve 28, together with a coil spring 40 encircling the sleeve and compressed between the two stampings in such a manner as to urge them apart. After the two stampings are in place, sleeve 28 is spun outwardly at its right end to form a flange 42. Flanges 30 and 42 prevent the stampings from coming off the sleeve, and flange 42 also serves to transmit the tension of spring 40 from stamping 34 to the sleeve 28.

The socket of the joint includes a second two stampings 44 and 46 having spherical surfaces engaging the first two stampings 32 and 34 respectively and against which the stampings 32 and 34 are yieldingly urged by the spring 40. Stamping 44 has a central opening through which the sleeve 28 and a portion of stamping 32 may project, but stamping 46 is preferably unbroken and closes the right end of sleeve 28. The two stampings 44 and 46 have base flanges 48 and 50, the latter being shown spun over the former to fasten the two stampings permanently together. The flanges 48 and 50 jointly form a base which can be bolted or otherwise secured to the frame 10. In the arrangement illustrated, the entire support is to the left of this base, so that it may be bolted flat against the side of the chassis frame, but stamping 46 is, as nearly as possible in the plane of the base. The entire joint may be packed with a hard grease when made.

While one illustrative embodiment has been described in detail, it is not my intention to limit the scope of the invention to that particular embodiment, or otherwise than by the terms of the appended claims.

I claim:

1. A support comprising, in combination, a tubular shaft-receiving sleeve flanged outwardly at both ends, a pair of hemi-spherical ball stampings having alined central tubular portions sleeved thereon and prevented from coming off the sleeve by the flanged ends but having considerable play axially of said sleeve, and a coil spring encircling the sleeve and compressed between the two stampings, the sleeve and the stampings and the spring forming the ball member of a ball-and-socket joint, together with a socket including two stampings having spherical portions engaging the first two stampings respectively and against which the first two stampings are urged apart by said spring, said second two stampings having outwardly projecting base flanges secured together and arranged in a plane perpendicular to the normal or central position of the sleeve axis.

2. A support comprising, in combination, a tubular shaft-receiving sleeve flanged outwardly at both ends, a pair of hemi-spherical ball stampings having alined central tubular portions sleeved thereon and prevented from coming off the sleeve by the flanged ends but having considerable play axially of said sleeve, and a coil spring encircling the sleeve and compressed between the two stampings, the sleeve and the stampings and the spring forming the ball member of a ball-and-socket joint, together with a socket including two stampings one of which has a portion extending across and closing one end of said sleeve and which two second stampings have spherical portions engaging the first two stampings respectively and against which the first two stampings are urged apart by said spring, said second two stampings having outwardly projecting base flanges secured together and arranged in a plane perpendicular to the normal or central position of the sleeve axis.

3. A shaft support comprising a sleeve, hemi-spherical members on the sleeve, a compression member between the hemi-spherical members, means retaining the hemi-spherical members on the sleeve and a socket embracing the hemi-spherical members.

4. A shaft support comprising a sleeve, hemi-spherical members on the sleeve, a compression member between the hemi-spherical members, and a two-part socket embracing the hemi-spherical members.

5. A shaft support comprising a sleeve, hollow hemi-spherical members positioned thereon, means in the hollow hemi-spherical members tending to force them apart, means on the sleeve limiting the movement thereof and a two-part socket receiving the telescopic members having flanges secured together.

6. A shaft support comprising a sleeve adapted to receive the shaft, hemi-spherical members positioned for axial movement on the sleeve, a compression member between the hemi-spherical members, flanges on the sleeve for retaining the hemi-spherical members, a socket for the hemi-spherical members having two parts, each provided with a bearing surface for the respective hemi-spherical members, and means for securing the parts together.

In testimony whereof, I have hereunto signed my name.

WILLIAM S. WATTS.